Figure 1:
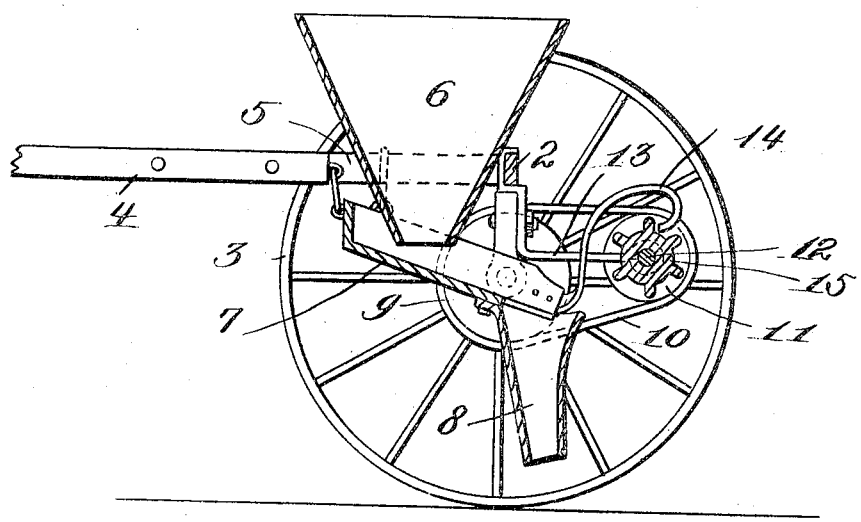

No. 797,946. PATENTED AUG. 22, 1905.
J. W. DAVENPORT.
FERTILIZER DISTRIBUTER.
APPLICATION FILED FEB. 27, 1905.

Witnesses:
C. W. Kesler
Dennis Sumby

Inventor
John W. Davenport
By James L. Norris
Atty.

UNITED STATES PATENT OFFICE.

JOHN W. DAVENPORT, OF LUDLOW, MISSISSIPPI.

FERTILIZER-DISTRIBUTER.

No. 797,946.  Specification of Letters Patent.  Patented Aug. 22, 1905.

Application filed February 27, 1905. Serial No. 247,549.

*To all whom it may concern:*

Be it known that I, JOHN W. DAVENPORT, a citizen of the United States, residing at Ludlow, in the county of Scott and State of Mississippi, have invented new and useful Improvements in Fertilizer-Distributers, of which the following is a specification.

This invention relates to fertilizer-distributers capable of use in many different connections—for example, with a cultivator—the object of the invention being to provide a simple and effective device of this character which will thoroughly and evenly, without waste, distribute fertilizer over desired areas.

In the drawings accompanying and forming a part of this specification I illustrate a wheeled vehicle, which may be a cultivator of known construction, with which is represented as combined fertilizer-distributing means involving my invention, which I will set forth in detail in the following description. I do not limit myself to the disclosure thus made, for certain variations may be adopted within the scope of my claims succeeding said description.

Figure 2:
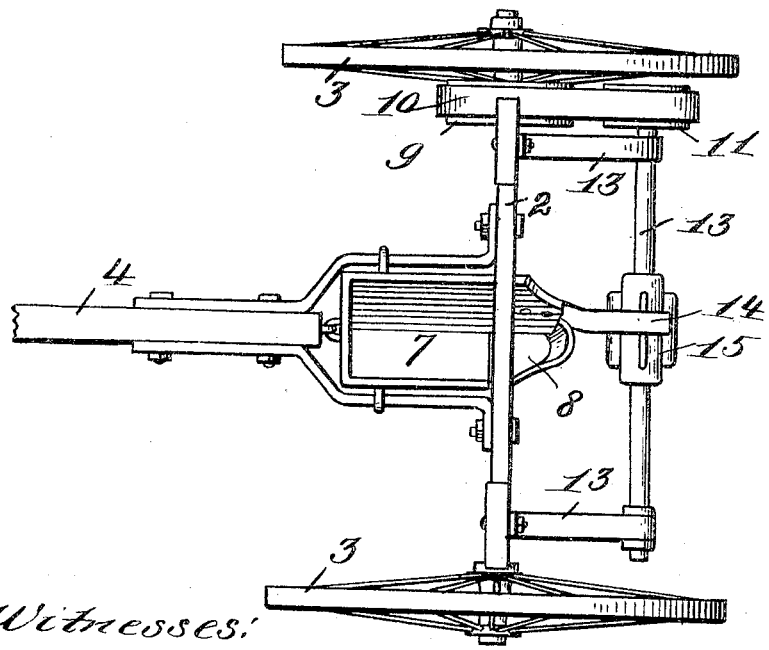

Referring to the drawings, Figure 1 is a vertical sectional side elevation of part of a cultivator or equivalent apparatus in which is embodied fertilizer-distributing means involving my invention. Fig. 2 is a top plan view of the parts represented in the preceding figure, the hopper shown in the latter being removed.

Like characters refer to like parts throughout the views.

As previously stated, I may use my fertilizer-distributer in various connections. It is shown as in conjunction with a wheeled vehicle, which in itself forms no part of the invention, so that a detailed description of said wheeled vehicle is not necessary except so far as to briefly refer to the parts thereof which coact with the fertilizer-distributing means.

The wheeled vehicle shown in the drawings is part of a cultivator and involves in its make-up an axle, as 2. Said axle is represented as being of yoke form and as provided at its opposite ends with wheels, as 3.

The pole of the vehicle is designated by 4, and it is shown as connected by hounds, as 5, with the uppermost part of the axle 2. In the space bounded by the hounds and axle the lower end of a hopper, as 6, for containing fertilizer fits, said hopper being rigidly held in place in any desirable way. The fertilizer from the hopper passes into a shoe, as 7, supported for vibration or oscillation in any desirable way. For example, the shoe may be hung or suspended for such motion from the hounds 5. The shoe is of trough or angular form in cross-section, the front thereof being closed. The opposite or rear end of the shoe is open to permit the passage of the fertilizer from the shoe, when the latter is vibrated or jarred, into a tube, as 8, connected with said shoe in any desirable way, the tube serving to properly direct the fertilizer onto the ground.

Rigidly connected with one of the wheels 3 is a wheel 9, over which a belt, as 10, is passed, said belt also passing around a wheel 11. The wheels 9 and 11 may be pulleys and the belt plain, or said wheels and belt may be of the sprocket form, as desired, this being an immaterial matter.

The driven wheel 11 is rigidly carried by a shaft, as 12, rotatively supported at its opposite ends by brackets, as 13, fastened to and extending rearward from the vertical portions of the axle 2. It therefore follows that when the cultivator is moved forward the shaft 12, through the intermediate connections with one of the wheels 3, will be rotated, the shaft rotating in the direction of the wheel.

One of the angular walls of the shoe 7 extends rearward beyond the other, and to the under side of this extension is fastened in some desirable manner the body or shank of an arm 14, of resilient material. The shaft 12 rigidly carries a tappet or shoe-vibrating wheel 15, the teeth of which are adapted to engage the free end of the arm 14 to cause the vibration of the shoe 7, and the consequent distribution of the fertilizer from said shoe into the tube 8, from which latter such fertilizer, as will be understood from what has been hereinbefore stated, is directed onto the ground. As the tube is vibrated with the shoe, there is no possibility of the fertilizer accumulating or caking in the tube. The arm 14 overhangs the tappet or shoe-vibrating wheel 15, the latter having elongated peripheral teeth to successively engage the free end of said arm. The free portion of the arm, it will be observed, is bowed, so that the teeth of the wheel 15 will engage only the extreme end of the arm. The weight of the shoe, tube, and arm causes the arm automatically to engage the periphery of the wheel 15. When a tooth engages the free end of said arm, the latter and necessarily the shoe will be elevated, and when said tooth passes out of contact with the arm the latter and necessarily the shoe will fall. As the wheel 15 rotates a rapid motion of the shoe will be caused.

By the organization hereinbefore described I can with rapidity and without scattering of the fertilizer distribute the latter in an effective and thorough manner and at the same time prevent the fertilizer from adhering to the shoe and other parts moving therewith. The mechanism is simple in construction, can be inexpensively made and its parts readily assembled in operative relation, and said mechanism can be attached to existing cultivators without any change in the construction of the latter.

The tube 8, as will be evident, is located in advance of the cultivator-shovels.

In practice I will arrange within the hopper 6 an agitating device of some suitable kind mounted on a shaft supported by the hopper and arranged to be driven by a belt, sprocket, or other gearing from one of the wheels 3. The agitator when in motion loosens up the fertilizer mass in the hopper to such an extent as to prevent it lumping or caking therein, thereby assuring the free feed of the mass from the hopper.

Having thus described my invention, what I claim is—

1. The combination of a wheeled vehicle, a hopper for containing fertilizer, a vibratory trough-shaped shoe under the hopper, having a closed forward end, an arm rigidly fastened to said shoe and extending rearward therefrom, a shaft provided with a tappet for engaging said arm, the teeth of the tappet serving to elevate the arm and shoe, and the shoe and arm, by their weight, serving to rest against the tappet, and mechanism, arranged for operation from the wheeled vehicle as the latter is propelled forward, for rotating said shaft.

2. The combination of a wheeled vehicle, a hopper for containing fertilizer, a vibratory trough-shaped shoe under the hopper, having a closed forward end, an arm rigidly fastened to said shoe and extending rearward therefrom, a shaft provided with a tappet for engaging said arm, the teeth of the tappet serving to elevate the arm and shoe, and the shoe and arm, by their weight, serving to rest against the tappet, mechanism, arranged for operation from the wheeled vehicle as the latter is propelled forward, for rotating said shaft, and a tube for receiving the fertilizer from the shoe, depending from and movable with the shoe.

3. In a fertilizer-distributer, the combination of a vehicle having an axle and wheels on said axle, a hopper for containing fertilizer, supported by the framing of the vehicle, a vibratory shoe of trough form, having a closed forward end, also supported by said framing, an arm rigidly attached to and extending rearward from the shoe, a tube depending from, rigidly connected with, and arranged to receive the fertilizer from, said shoe, a shaft, brackets on the said axle for rotatively supporting said shaft, a tappet-wheel on said shaft for engaging said arm to cause the vibration of the shoe, a driving-wheel rotative with one of the cultivator-wheels, a driven wheel on said shaft, and a belt operatively connecting the driving and driven wheels.

In testimony whereof I have hereunto set my hand in presence of two subscribing witnesses.

JOHN W. DAVENPORT.

Witnesses:
   Thos. B. Graham,
   O. R. Singleton.